Figure 1:
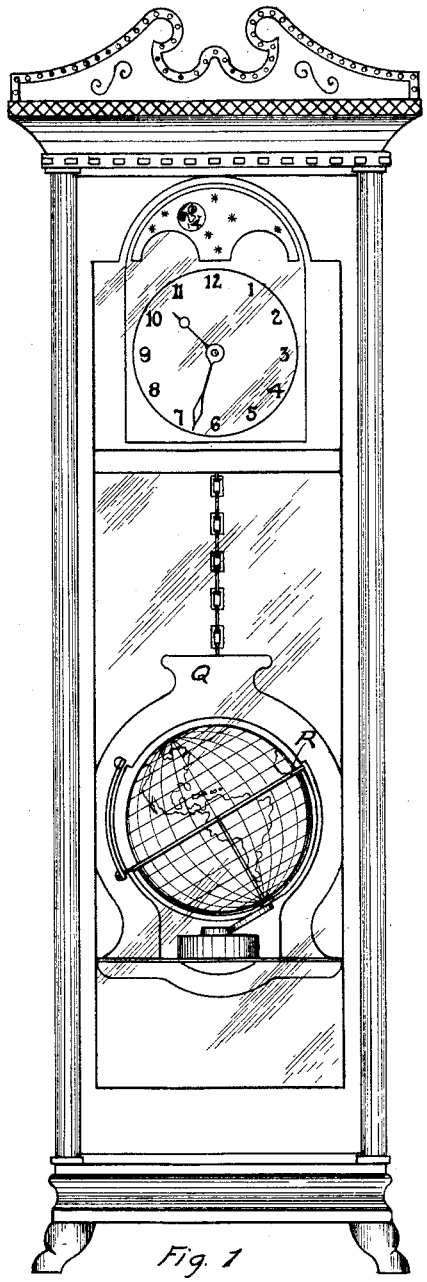

W. H. HALL.
TELLURIAN CLOCK.
APPLICATION FILED MAY 20, 1910.

1,040,310.

Patented Oct. 8, 1912.

5 SHEETS—SHEET 1.

W. H. HALL.
TELLURIAN CLOCK.
APPLICATION FILED MAY 20, 1910.

1,040,310.

Patented Oct. 8, 1912.
5 SHEETS—SHEET 2.

Witnesses
William H. Waters
Chas Hancock

Inventor
William H Hall

W. H. HALL.
TELLURIAN CLOCK.
APPLICATION FILED MAY 20, 1910.

1,040,310.

Patented Oct. 8, 1912.

5 SHEETS—SHEET 3.

Witnesses
William H. Waters
Chas Hancock

Inventor
William H. Hall

COLUMBIA PLANOGRAPH CO., WASHINGTON, D. C.

W. H. HALL.
TELLURIAN CLOCK.
APPLICATION FILED MAY 20, 1910.

1,040,310.

Patented Oct. 8, 1912.
5 SHEETS—SHEET 4.

Witnesses
William H. Water
Chas Hancock

Inventor
William H. Hall

W. H. HALL.
TELLURIAN CLOCK.
APPLICATION FILED MAY 20, 1910.
1,040,310.
Patented Oct. 8, 1912.
5 SHEETS—SHEET 5.
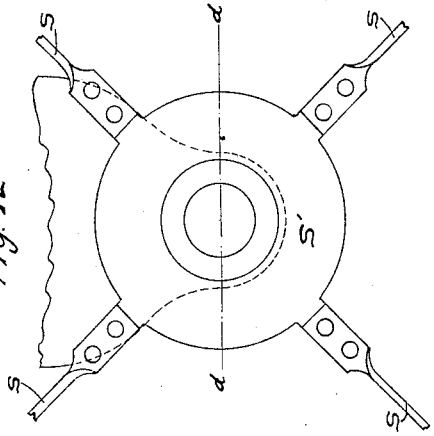
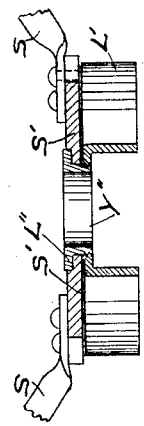
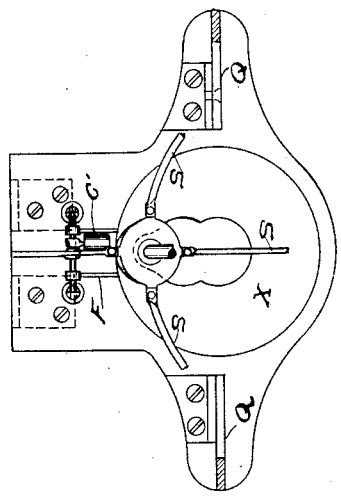
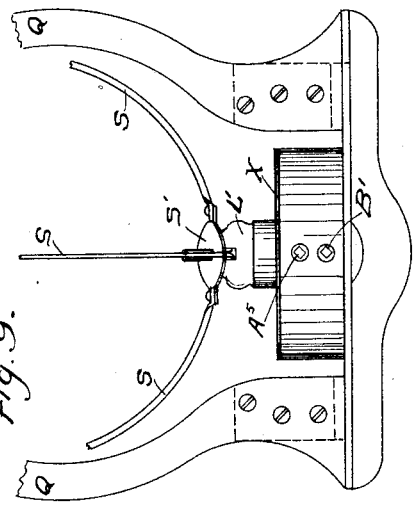
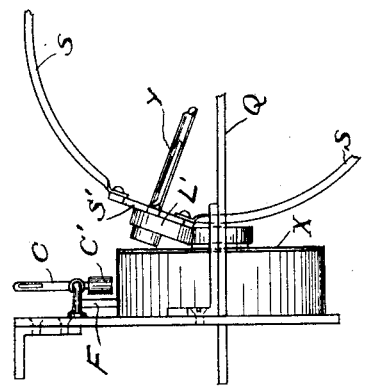
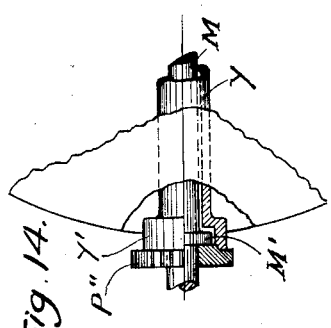
Witnesses
William H Waters
Chas Hancock
Inventor
William H Hall

UNITED STATES PATENT OFFICE.

WILLIAM H. HALL, OF CICERO, ILLINOIS, ASSIGNOR TO MATTIE A. HALL, OF CICERO, ILLINOIS.

TELLURIAN-CLOCK.

1,040,310.      Specification of Letters Patent.      Patented Oct. 8, 1912.

Application filed May 20, 1910. Serial No. 562,553.

*To all whom it may concern:*

Be it known that I, WILLIAM H. HALL, a citizen of the United States, residing in the town of Cicero, in the county of Cook and State of Illinois, have invented a new and useful Improvement in Tellurian-Clocks, of which the following is a specification.

The object of this invention is to so mount a globe bearing on its outer surface a map of the world (one-half of which is at all times obscured), that said globe may be rotated by means of an ordinary clock movement in such a manner that the exposed surface of the globe and the map thereon will at all times correspond with that portion of the earth's surface which is under the rays of light from the sun, showing the exact points of sunrise and sunset, and the time of day or night throughout the world.

It is desirable to mount the globe in an ordinary hall clock case, but it may be mounted in any suitable manner, either above, below or on either side of the clock movement. As it is impossible to revolve the globe around an imaginary sun, as is done by means of a regular tellurian, thereby maintaining the parallelism of the axis, and as the object of this invention is to operate the globe by means of the regular clock movement in such a manner that the movements of the exposed surface will at all times correspond with the movements of that portion of the earth's surface that is under the rays of the sun, we cause the poles of the globe to revolve around a fixed perpendicular center, from right to left, once each yeaer. (See Fig. 3, dotted line *a a*.) The globe being mounted on an axis inclined at an angle of 23½ degrees to the said perpendicular center, it will be seen that in the course of one year's time the axis will assume all the different angles to rays of light from an imaginary sun placed in front of said globe that the axis of the earth does to rays of light from the sun during the different seasons of the year. This movement would also carry all points on the globe past any fixed point, from east to west, once each year, corresponding with the movements of the surface of the earth under the rays of the sun in the annual revolution of the earth around the sun. Another motion, corresponding to the daily motion of the earth, is imparted to the globe by the clock movement, whereby the globe is caused to rotate upon its axis from left to right or west to east, once every 23 hours, 56 minutes and 4 seconds, but which, owing to the "backward movement" caused by the annual revolution in the opposite direction, will carry all points on the surface of the globe past any fixed point once every 24 hours. In practical daily use it is necessary to impart these two opposite movements simultaneously. But for the purpose of setting the globe to correspond with the clock or the season, or for the purpose of reference or demonstration, when it is desired to operate the globe by hand, it is necessary that they be automatically independent of each other and also independent of the clock movement, because one motion is 366 times faster than the other and it is impractical, and dangerous to the mechanism, to impart both motions at one time except through the slow, steady action of the regular clock movement.

Figure 2:
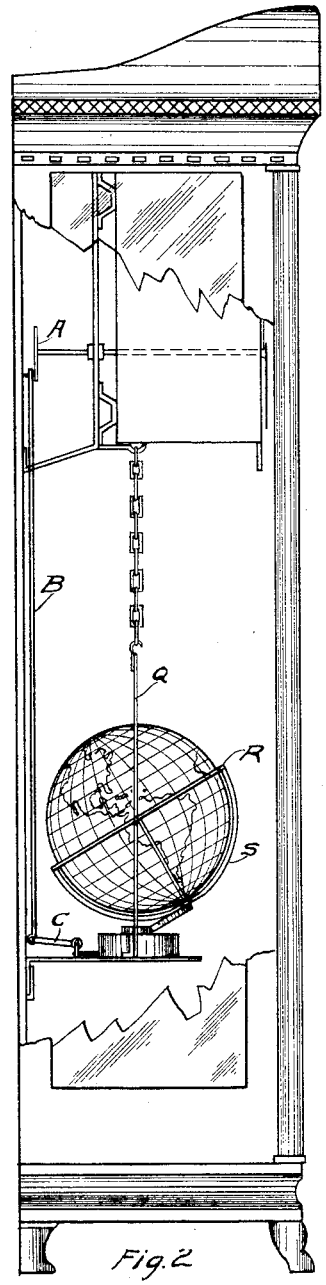
Figure 3:
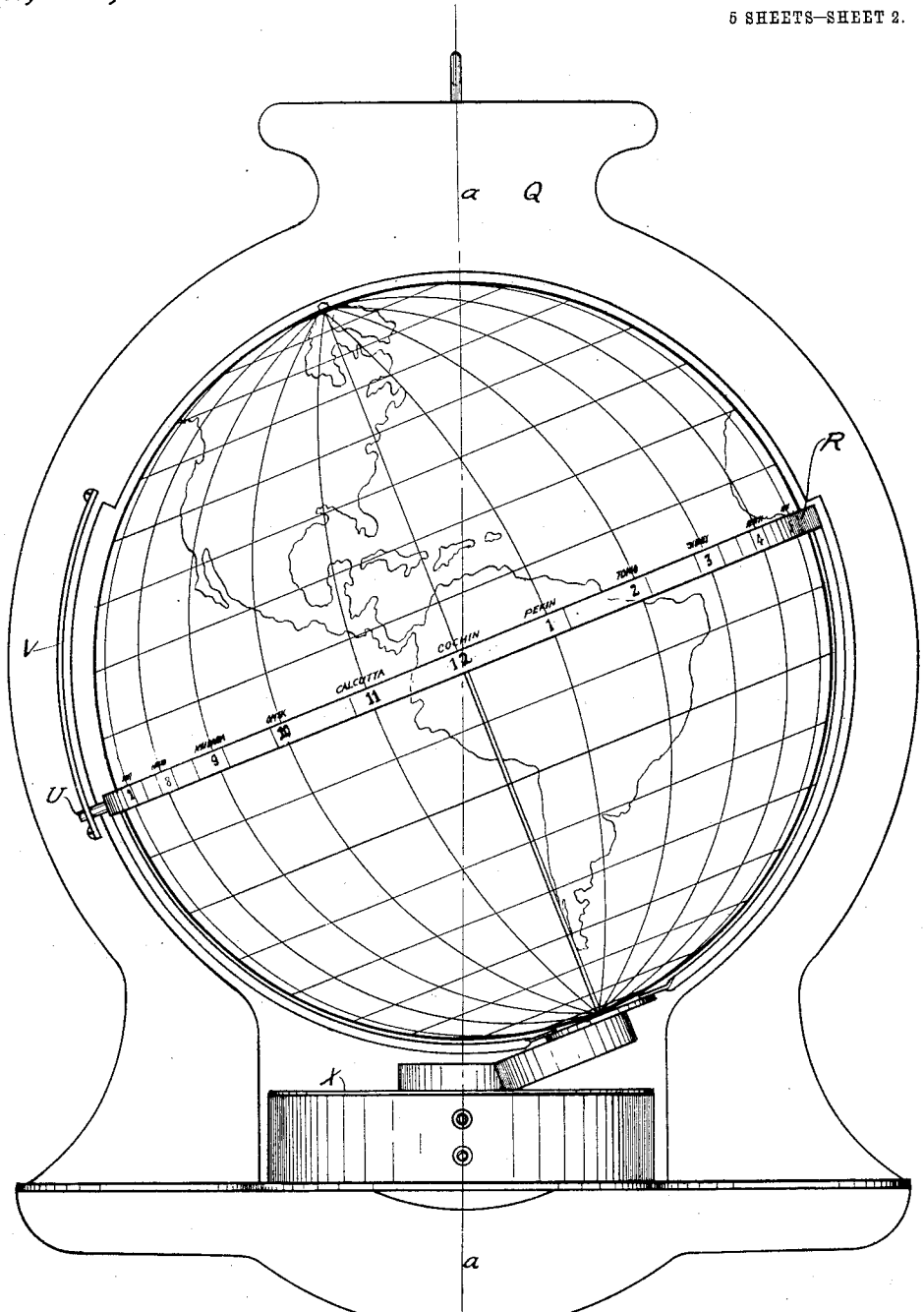
Figure 4:
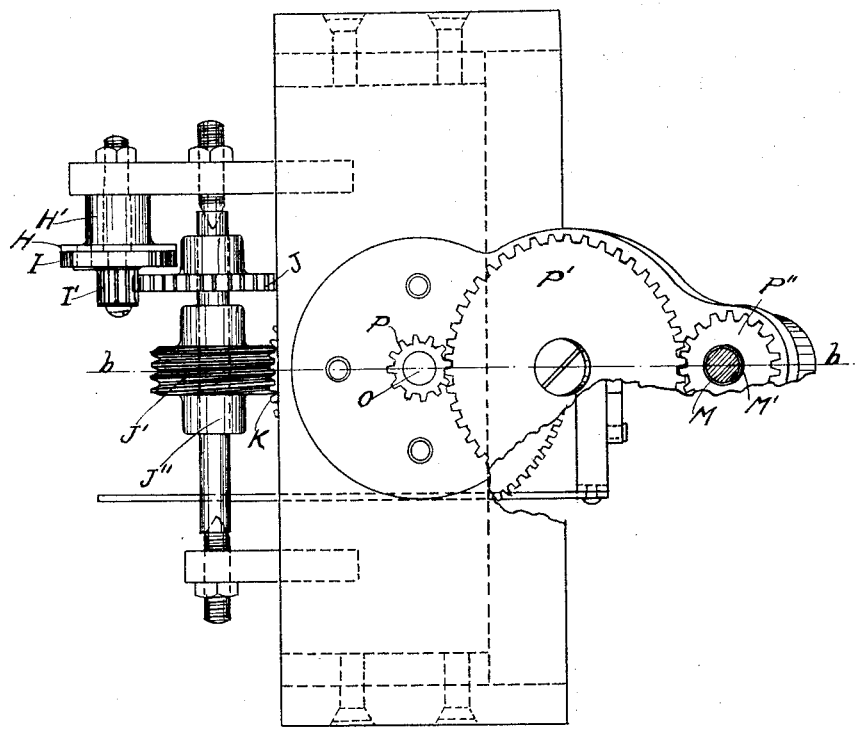
Figure 5:
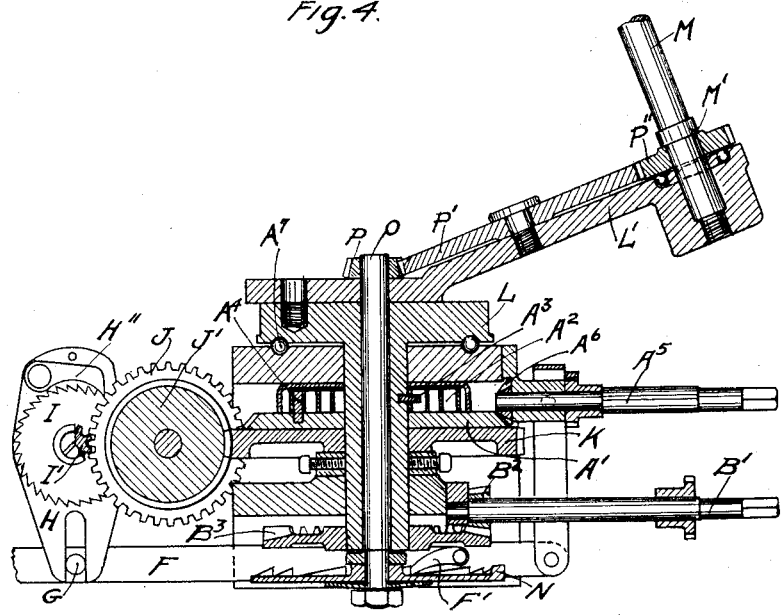
Figure 6:
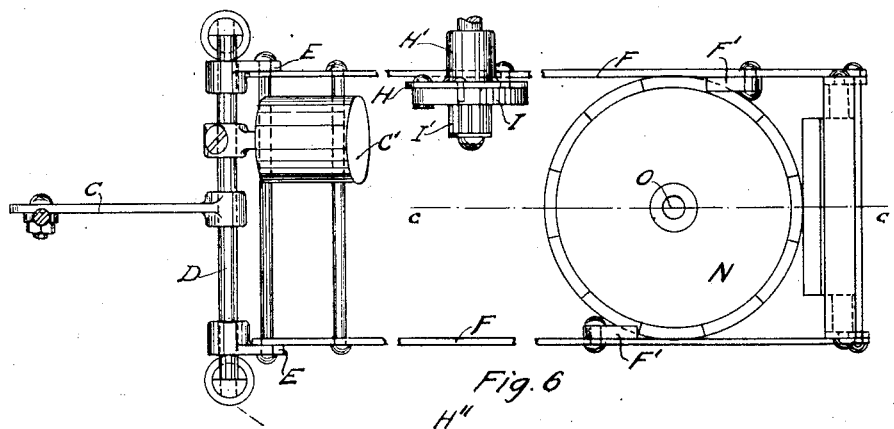
Figure 7:
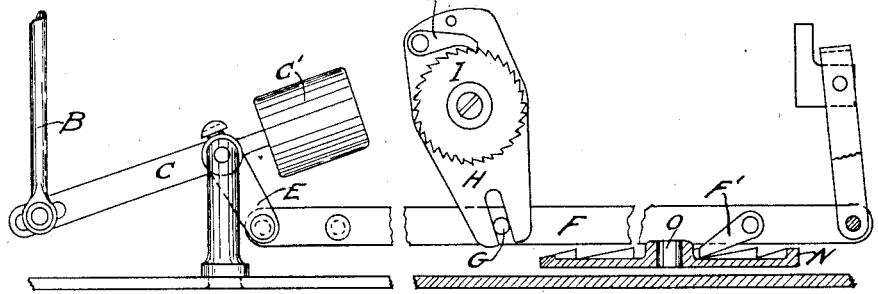
Figure 8:
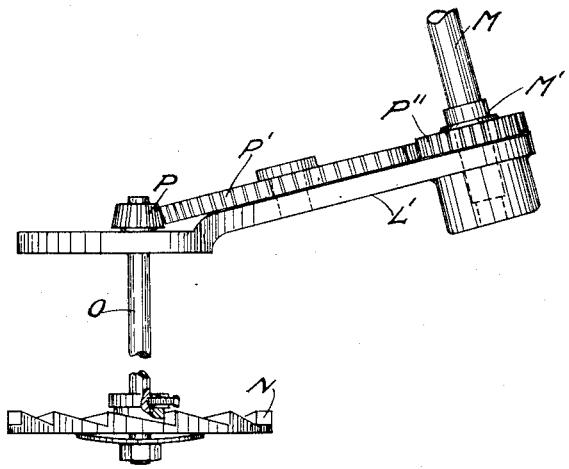
Figure 15:
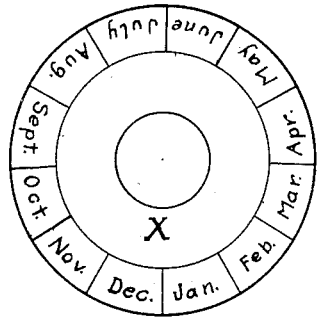

Following is a description of the different views:

Figure 1 is a front elevation of an ordinary hall clock case with the globe mounted therein, the position of the globe being that of Sept. 23rd. Fig. 2 is a side elevation of the same case, but with the globe in the position of December 22nd. Fig. 3 is an enlarged view of the globe and its mountings as shown in Fig. 1. Fig. 4 is a full size top view of the mechanism with the globe and casing removed. Fig. 5 is a full size sectional view of Fig. 4 on the line *b b*. Figs. 6, 7 and 8 are full sized detailed drawings of the mechanism that imparts to the globe the daily motion of one rotation every 24 hours from left to right. Fig. 6 is a top view. Fig. 7 is a sectional view on the line *c c* of Fig. 6. Fig. 8 is a side view of the train of gears showing a section of the axis on which the globe is mounted. Figs. 9, 10, 11, 12 and 13 are views of the time indicator with the globe removed. Fig. 9 is a front view with the mechanism in the position shown in Fig. 2. Fig. 10 is a top view. Fig. 11 is a side view with the mechanism in the position shown in Fig. 1. Fig. 12 is a top view of the base that supports the arms which support and control the movement of the time band that encircles the globe at the equatorial line. Fig. 13 is a sectional view of Fig. 12 on the line *d d*, showing the manner of revolubly mounting the base on the mechanism. Fig. 14 is a detailed view of the manner in which the globe, at the point of the South Pole, rests upon and is revolved by the wheel P''. Fig. 15 is a top view of the plate X shown in Figs. 3, 9 and 11 which indicates the position of the globe for the different months and seasons. It revolves annually with the globe from right to left.

The same general results may be obtained by changing some of the mechanism described, hence I do not confine myself to all the details of this one plan.

Following is a detailed description of the preferred plan of mechanism which imparts to the globe the annual revolution from right to left.

In Fig. 2 the crank A is rigidly attached to the rear end of the minute hand shaft of the clock movement and hence makes one revolution every hour. The upper end of the pitman B is coupled to this crank and the lower end is coupled to the rocking lever C.

Referring now to Figs. 6 and 7 which show full sized top and side views respectively of this lever C and its connections, (the weight C' being for the purpose of counterbalancing the weight of the pitman B). The lever C is rigidly attached to the shaft D. Attached to this same shaft are the twin levers EE. Coupled to these two levers are the twin reciprocating bars FF. On one of these bars is the pin G working in a slot in the bottom of the swinging lever H, this lever swinging on the shaft H'. On the top of this lever H is the pawl H'' adapted to engage one tooth in the ratchet wheel I at each stroke of the lever, and move the wheel forward that distance.

Referring now to Fig. 4, the pinion I' is rigidly mounted on the side of the ratchet wheel I and engages the toothed wheel J. The toothed wheel J and the worm J' are both rigidly mounted on the shaft J''. The worm J' engages the teeth of the wheel K, (see Fig. 5). This wheel K is frictionally mounted on the vertical sleeve or hollow shaft L which revolves around the fixed center indicated by the line $a\ a$ in Fig. 3. On the top of this shaft is rigidly mounted the supporting arm L', on the outer end of which is rigidly mounted the axis M, and on this axis the globe is mounted. As the crank A makes one revolution each hour it will be seen that the pitman B and all the connecting levers above described, including the reciprocating bars FF, will make one full stroke in each direction each hour. Hence the pin G, Fig. 7, through the lever H and the pawl H'' will move the ratchet wheel I forward the distance of one tooth each hour. This ratchet wheel has 24 teeth, hence it makes one revolution every 24 hours. The pinion I' which is rigidly mounted on the side of this ratchet has one-fifth as many teeth as the toothed wheel J with which it meshes, hence it will be seen that the toothed wheel J and the worm J' will make one revolution once every 120 hours, or once every five days. The toothed wheel K has 73 teeth and will move forward the distance of one tooth for each revolution of the worm J', hence the toothed wheel K, the sleeve L and the arm L' will make one revolution every 365 days, the relation of the train of gears being such that they revolve from right to left, and as the globe is mounted on the axis M on the outer end of the arm L' it will make the same revolution, the motion thus imparted to the surface of the globe corresponding to the annual revolution of the earth around the sun.

As an aid to the clock movement in performing the work above described, the beveled gear wheel A' is rigidly mounted on the sleeve L. Above this is mounted the coil spring $A^2$, the inner end of which is attached to the sleeve L by the pin $A^3$ and the outer end is attached to the beveled wheel A' by the pin $A^4$. This spring is wound up by means of the key post $A^5$ and the beveled pinion $A^6$ which meshes with the wheel A', the tension of the spring when wound up being sufficient to revolve the sleeve L together with the arm L' and the globe which it carries on its outer end. To further facilitate a free and easy movement the ball-bearing $A^7$ is provided. Inasmuch as the sleeve L makes but one revolution each year, one winding each year of an average sized spring will be sufficient to do the work and keep it at practically the same tension all the time. The result of the action of this spring $A^2$ is to practically remove all resistance to the clock movement, the worm J' acting as a restraint on the action of the spring, and as the worm revolves through the teeth of the wheel K it releases the restraint and allows the spring to turn the sleeve L.

Following is a detailed description of the mechanism which imparts to the globe the daily rotation from left to right.

It has been shown herein how the reciprocating bars FF make one full stroke in each direction once each hour, each stroke being a little more than one-half the measure of one tooth in the wheel. On each of these bars are pawls F' F', (see Figs. 6, 7 and 8.) These pawls are adapted to alternately engage the teeth of the ratchet wheel N, each pawl as it becomes engaged moving the wheel forward a distance equal to one-half the measure of one tooth and imparting to it an almost continuous circular motion, and as the wheel has 12 teeth and is moved forward the distance of $\frac{1}{2}$ tooth every $\frac{1}{2}$ hour, the wheel will make one revolution every 12 hours. This wheel is frictionally mounted on the bottom of the vertical shaft O. On the upper end of this shaft is the beveled pinion P, which meshes with the toothed wheel P′, and this in turn meshes with the wheel P″. The beveled pinion P makes one revolution every 12 hours, and as this pinion has only one-half as many teeth as the toothed wheel P″, it follows that the wheel P″ will make one revolution every 24 hours.

Referring now to Fig. 5, it will be seen that this wheel P″ revolves on a ball-bearing and is held in position by the axis M passing through it and being rigidly mounted on the end of the arm L′, the axis having a collar M′ rigidly mounted in just the right position to hold the wheel in position.

Referring to Fig. 14, which shows the lower segment of the outside wall of the globe and the manner in which the globe is mounted on the wheel P″. The tube Y runs through the globe from pole to pole, being rigidly attached to the wall of the globe at its upper and lower ends. (Fig. 14 shows the lower end, or the South Pole.) The inside diameter of this tube is larger than the axis M, but at its upper end a collar is fitted to the tube, having an inside diameter just large enough to allow the upper end of the axis to pass through. The lower end of the tube as shown in Fig. 14 is enlarged, the inside diameter of the lower end being large enough to entirely clear the rigidly mounted collar M′ and fit snugly over the shoulder on the upper side of the wheel P″. Thus it will be seen that the entire weight of the globe is borne by the wheel P″, and revolves with the wheel entirely clear of the rigidly mounted axis M, except at the extreme upper end. The enlarged lower end of the tube Y passes through a circular opening in the stud screw S′, the opening being just large enough to allow free movement of the tube. (See Fig. 13.)

Practical tests have demonstrated that the resistance does not affect the operation of the ordinary clock movement. This operation will rotate the globe on the axis once every 23 hours, 56 minutes and 4 seconds from left to right. The rotation would be once every 24 hours were it not for the "backward movement" caused by the annual revolution from right to left which amounts to about one degree per day. But the stroke of the reciprocating bars FF being a little more than one-half the measure of one tooth in the ratchet wheel N, the pawls overreach and take up this "backward movement" once every half hour, so that the globe apparently makes one rotation every 24 hours.

Following is a detailed description of the preferred plan of time-indicating devices, referring to Figs. 1, 2 and 3. One-half the globe is at all times obscured by the screen Q and sunrise on all points of the globe is indicated by the left hand side of the screen where the points on the globe first come into view; sunset being indicated by the right hand side of the screen where the points on the globe disappear from view. As the meridians on the surface of the globe come into view on the left they gradually move from left to right under the figures on the time-indicating band R. These figures, it will be observed, correspond with the figures on the clock dial, beginning with 6 o'clock morning on the extreme left and ending with 6 o'clock evening on the right, and they indicate the time of day of the meridians under them on the exposed surface of the globe. The time of night is indicated by printing the names of principal points of the world on the surface of the globe at the equatorial band, exactly opposite where the places are located. (See Fig. 3.) For example, when the name "Cochin" (China) printed on the equatorial band on the surface of the globe appears under the figures "12" it means it is 12 o'clock midnight at Cochin, China, while it is 12 o'clock daytime on the meridian under "12" on the exposed surface of the globe. This time-indicating band does not revolve with the globe, but is caused to adjust itself to the different angles of the equatorial band on the globe for all the different seasons of the year in the following manner: The band is supported by the four arms SSSS and these are rigidly attached to the base S′. This base is revolubly mounted on the arm L′ of the sleeve L as shown in Fig. 13. A stud screw L″ is passed through a circular hole in the center of the base S′ and firmly screwed into the casing. This screw has a shoulder on its upper end as shown in Fig. 13, and when firmly set allows the base a free circular motion, but holds the base, the arms and the time indicating band R always at the same angle as the arm L′ and the equatorial band on the globe. To prevent the time indicating band and arms and base from revolving with the globe, a pin U is rigidly mounted at one side of the band and adapted to slide up and down against the guide V, thus allowing the band to change angles to correspond at all times with the equatorial band on the globe, but preventing any rotary motion.

The proper position of the globe for the different months and seasons of the year is indicated by the plate X, a top view of which is shown in Fig. 15. This plate, with the arm L′, is rigidly mounted on the upper end of the sleeve L and revolved from right to left once each year with the sleeve. It is so mounted that when the name of the current month is brought directly in front, the axis of the globe will be in the proper position for that month.

Either motion of the globe may be independently imparted by hand without interference with the clock movement, in the following manner: A key is placed on the outer end of the post B¹ on the inner end of which is rigidly mounted the beveled pinion B² which meshes with the beveled wheel B³. The wheel B³ is rigidly mounted on the sleeve L and when the key is turned the sleeve revolves carrying the arm L' and the globe around with it. The ratchet wheel N being frictionally mounted on the lower end of the sleeve and prevented from turning because of the contact of the teeth with the pawls F' F', will remain stationary while the sleeve is being turned.

The daily motion is imparted to the globe by putting the fingers on the surface of the globe and turning it from left to right. As heretofore described, the full weight of the globe rests on the wheel P'' and when the globe is thus revolved by hand the friction will also turn the wheel P''. This operates the entire train of gears with which the wheel is connected, causing the slanting side of the teeth on the wheel N to pass under the pawls with a clicking sound, but having no other effect on the clockwork or other mechanism.

Having thus described my invention, I claim:—

1. In a tellurian clock, the combination with a clock movement, of a globe, a train of gears adapted to be operated by the clock movement to rotate the globe upon its own axis once every twenty-four hours, a ratchet wheel connected with said train of gears, two pawls engaging the teeth of the ratchet wheel alternately to impart to the train of gears and the globe an almost continuous motion, and means for operating said pawls from the clock movement, substantially as described.

2. In a tellurian clock, the combination with a clock movement and frame, of a screen having an opening to receive a globe and to conceal one half thereof from view, a globe having a diurnal rotation about its axis from left to right and an opposite annual rotation of its axis from right to left, an annual rotating inclined supporting arm turning about a vertical axis and provided with and carrying an axis for the globe, connecting gearing between the globe and the clock movement for imparting thereto its diurnal rotation about its own axis from and by the power of the clock movement, and an independent connecting gearing between the globe supporting arm and clock movement for imparting to the globe the annual revolution of its axis about said vertical axis, and a secondary spring independent of the clock movement to supply the power for imparting said annual movement to the globe axis and its supporting arm, substantially as specified.

3. In a tellurian clock, the combination with a clock movement and frame, of a screen having an opening to receive a globe and to conceal one half thereof from view, a globe having a diurnal rotation about its axis from left to right and an opposite annual rotation of its axis from right to left, an annual rotating inclined supporting arm turning about a vertical axis and provided with and carrying an axis for the globe, connecting gearing between the globe and the clock movement for imparting thereto its diurnal rotation about its own axis from and by the power of the clock movement, and an independent connecting gearing between the globe supporting arm and clock movement for imparting to the globe the annual revolution of its axis about said vertical axis, and a secondary spring independent of the clock movement to supply the power for imparting said annual movement to the globe axis and its supporting arm, a non-revolving, oscillating time band encircling the globe, substantially as specified.

4. In a tellurian clock, the combination with a clock movement and frame, of a screen having an opening to receive a globe and to conceal one half thereof from view, a globe having a diurnal rotation about its axis from left to right and an opposite annual rotation of its axis from right to left, an annual rotating inclined supporting arm turning about a vertical axis and provided with and carrying an axis for the globe, connecting gearing between the globe and the clock movement for imparting thereto its diurnal rotation about its own axis from and by the power of the clock movement, and an independent connecting gearing between the globe supporting arm and clock movement for imparting to the globe the annual revolution of its axis about said vertical axis, and a secondary spring independent of the clock movement to supply the power for imparting said annual movement to the globe axis and its supporting arm, and a non-revolving, oscillating time band encircling the globe, said time band being mounted upon said supporting arm, and having means connecting it with said screen to prevent its revolving, while permitting it to oscillate to correspond with the changing path of the equatorial band of the globe, substantially as specified.

5. In a tellurian clock, the combination with a clock movement and frame, of a screen having an opening to receive a globe and to conceal one half thereof from view, a globe having a diurnal rotation about its axis from left to right and an opposite annual rotation of its axis from right to left, an annually rotating, inclined supporting arm turning about a vertical axis and provided with and carrying an axis for the globe, connecting gearing between the globe and the clock movement for imparting thereto its diurnal rotation about its own axis from and by the power of the clock movement, and an independent connecting gearing between the globe supporting arm and clock movement for imparting to the globe the annual revolution of its axis about said vertical axis, and a secondary spring independent of the clock movement to supply the power for imparting said annual movement to the globe axis and its supporting arm, and a non-revolving, oscillating time band encircling the globe, said time band being mounted upon said supporting arm, and having means connecting it with said screen to prevent its revolving, while permitting it to oscillate to correspond with the changing path of the equatorial band of the globe, said time band having curved supporting arms, a base plate to which said supporting arms are attached, said base plate having a swivel connection with said globe supporting arm, substantially as specified.

6. In a tellurian clock, the combination with a clock movement, of an inclined globe supporting arm turning about a vertical axis to impart an annual movement to the globe, a globe axis secured to said supporting arm, a diurnally rotating globe having a hollow shaft secured thereto and surrounding said globe axis, connecting gearing between the clock movement and the globe shaft for imparting to the globe its diurnal movement from and by the clock movement, said gearing including a gear wheel P″ having a ball bearing connection with said supporting arm and upon which the globe shaft directly rests, connecting gearing between said supporting arm and the clock movement and a secondary spring to supply the power for imparting to said supporting arm and the globe their annual movement, substantially as specified.

7. In a tellurian clock, the combination with a clock movement, of an inclined globe supporting arm turning about a vertical axis to impart an annual movement to the globe, a globe axis secured to said supporting arm, a diurnally rotating globe having a hollow shaft secured thereto and surrounding said globe axis, connecting gearing between the clock movement and the globe shaft for imparting to the globe its diurnal movement from and by the clock movement, said gearing including a gear wheel P″ having a ball bearing connection with said supporting arm and upon which the globe shaft directly rests, connecting gearing between said supporting arm and the clock movement and a secondary spring to supply the power for imparting to said supporting arm and the globe their annual movement, said supporting arm having a ball bearing connection with the frame, substantially as specified.

8. In a tellurian clock, the combination with a clock movement, of a globe having a diurnal rotation about its own axis and an annual revolution of its axis, connecting gearing between the clock movement and the globe for imparting thereto its diurnal movement from and by the power of the clock movement, an inclined globe supporting arm turning about a vertical axis, an independent gearing between the clock movement and said globe supporting arm for imparting to said arm and the globe carried thereby their annual movement, and a secondary spring supplying power to impart said annual movement, the force of said spring being controlled by the clock movement, substantially as specified.

9. In a tellurian clock, the combination with a clock movement, of a globe having a diurnal rotation about its own axis and an annual revolution of its axis, connecting gearing between the clock movement and the globe for imparting thereto its diurnal movement from and by the power of the clock movement, an inclined globe supporting arm turning about a vertical axis, an independent gearing between the clock movement and said globe supporting arm for imparting to said arm and the globe carried thereby their annual movement, and a secondary spring supplying power to impart said annual movement, the force of said spring being controlled by the clock movement, said supporting arm having rigidly secured thereto an axis for the globe, said globe having a hollow shaft fixedly secured thereto and surrounding said axis on the supporting arm, said hollow shaft resting at its lower end on a wheel of said diurnal movement gearing and clearing said axis on the supporting arm, substantially as specified.

10. In a tellurian clock, the combination with a clock movement, of a globe having a diurnal rotation about its own axis and an annual revolution of its axis, connecting gearing between the clock movement and the globe for imparting thereto its diurnal movement from and by the power of the clock movement, an inclined globe supporting arm turning about a vertical axis, an independent gearing between the clock movement and said globe supporting arm for imparting to said arm and the globe carried thereby their annual movement, and a secondary spring supplying power to impart said annual movement, the force of said spring being controlled by the clock movement, said supporting arm having a hollow upright shaft and said gearing for imparting the diurnal rotation to the globe including a shaft extending through said hollow shaft of the globe supporting arm, substantially as specified.

11. In a tellurian clock, a movably mounted globe with suitable operating mechanism adapted to be connected with and operated by a clock movement through the medium of one operating rod, said mechanism comprising a rocking beam with a counterweight equal to the weight of the operating rod, and two downwardly extended arms supporting and operating two reciprocating bars, each bar provided with a pawl adapted to alternately engage the teeth of a ratchet wheel placed between the bars, thus imparting to the ratchet wheel an almost continuous motion, and through it to a train of gears leading to the globe, substantially as specified.

12. In a tellurian clock, the combination with a clock movement mechanism, of a globe having a diurnal rotation about its own axis and an annual revolution of its axis, an inclined supporting arm for said globe turning about a vertical axis and having an annual rotation about said axis, an independent operating mechanism for imparting to said globe its annual and diurnal movements, said operating mechanism being a unit by itself and entirely independent of said clock movement mechanism, a crank pin on the clock movement, a pitman connected with said crank pin, a rocking shaft connected with said globe operating mechanism and with said pitman, said globe operating mechanism including a reciprocating bar furnished with a pawl through which movement is imparted to said globe operating mechanism from said clock movement mechanism, substantially as specified.

13. In a tellurian clock, the combination with a clock movement and frame, of two trains of gears adapted to be operated simultaneously by the clock movement, a common operating member actuated by the clock movement and communicating motion to both of said trains of gears from said clock movement, said common operating member imparting to the globe through one of said trains of gears a diurnal revolution about its axis in one direction and through said other train of gears an annular rotation of its axis in the opposite direction, said globe being frictionally mounted on its operating mechanism and capable of being turned by hand in either direction independently of said operating mechanism, substantially as specified.

14. In a tellurian clock, the combination with a clock movement and frame, of two trains of gears adapted to be operated simultaneously by the clock movement, a common operating member actuated by the clock movement and communicating motion to both of said trains of gears from said clock movement, said common operating member imparting to the globe through one of said trains of gears a diurnal revolution about its axis in one direction and through said other train of gears an annual rotation of its axis in the opposite direction, said trains of gears being both automatically independent of each other and of the clock movement when the globe is turned either backward or forward without disconnecting the gearing by hand either for diurnal rotation about its own axis or for annual revolution of its axis, substantially as specified.

WILLIAM H. HALL.

Witnesses:
WILLIAM W. WATERS,
CHAS. HANCOCK.

---

Copies of this patent may be obtained for five cents each, by addressing the "Commissioner of Patents, Washington, D. C."